(No Model.)

A. L. EDWARDS.
GRAPE TONGS.

No. 342,341. Patented May 25, 1886.

Witnesses:
James F. Duhamel
Walter S. Dodge

Inventor:
Alfred L. Edwards,
by Dodge & Son
his Attys.

UNITED STATES PATENT OFFICE.

ALFRED L. EDWARDS, OF NEW YORK, N. Y.

GRAPE-TONGS.

SPECIFICATION forming part of Letters Patent No. 342,341, dated May 25, 1886.

Application filed November 25, 1885. Serial No. 183,959. (No model.)

*To all whom it may concern:*

Be it known that I, ALFRED L. EDWARDS, of New York, in the county of New York and State of New York, have invented certain new and useful Improvements in Individual Grape-Tongs, of which the following is a specification.

My invention relates to an implement for use in eating grapes or similar small fruit commonly taken in the fingers; and it consists in constructing the same in the form of small tongs, with cups or sockets for the finger and thumb, the portion connecting the cups or sockets forming a spring, which in the preferred form holds the two members apart but near each other.

Figure 1:
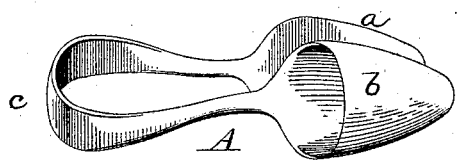
Figure 2:
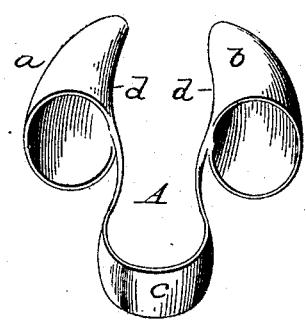
Figure 3:
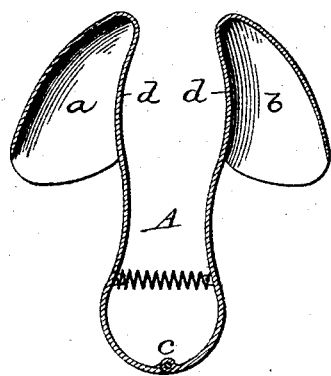
Figure 4:
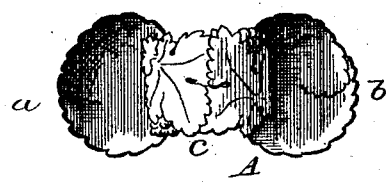
Figure 5:
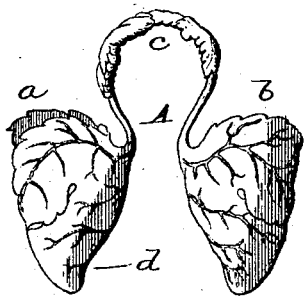
Figure 6:
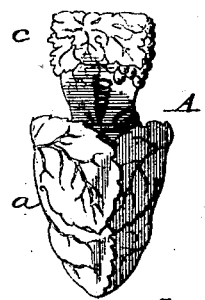

In the accompanying drawings, Figure 1 is a perspective view of my improved device; Fig. 2, a similar view, but from a different point; Fig. 3, a longitudinal sectional view; and Figs. 4, 5, and 6 are views showing the implement made in accordance with a different pattern or design.

It is well known that in eating grapes or other small fruit—such as commonly held in the fingers or between the forefinger and thumb—considerable annoyance is experienced through the stickiness imparted to the fingers by the juice of the fruit and through the soiling and staining of the fingers thereby.

The object of my invention is to obviate this difficulty and annoyance; and to this end it consists in constructing an implement which shall be adapted for the thumb and forefinger, and protect them from the juice of the fruit or from direct contact with any part of the fruit.

The form and construction of the implement will be readily understood by referring to the drawings, in which A represents the implement as a whole, consisting of finger-sockets or cups $a$ $b$ and the intermediate spring member, $c$. The cups are made of suitable form to grasp the grapes or other fruit to advantage, being preferably hollowed out slightly on their opposite faces, as at $d$, Fig. 3, the hollow or depression serving to prevent the fruit from slipping or being pressed out sidewise or endwise from between the two faces. The cups or sockets should be about an inch in depth, and of proper size to suit the forefinger and thumb of persons by whom they are to be used.

The spring $c$, which will preferably be integral with the cups or ends of the implement, should be sufficiently light and yielding to close readily under slight pressure or force to enable them to be readily manipulated and to prevent injury to the fruit.

The two arms of the device may, if preferred, be joined or hinged together, as shown in Fig. 3, and a separate spring employed to hold them separated, or the spring may in some cases be made to draw the arms together, instead of separating them. The design and material or materials used may be varied, as desired.

In Figs. 4, 5, and 6 I show a design introducing a grape-leaf, stem, and vine, or other members which seem peculiarly appropriate; but any other form may be adopted at pleasure.

Silver will be found suitable, and may be embossed, engraved, frosted, or otherwise figured to increase the ornamental effect, or left entirely plain, as preferred.

The implement may also be used in picking or stemming fruit, and for kindred purposes.

The caps or sockets $a$ $b$ must be water-tight, in order to keep the juice off the finger and thumb.

I am aware that a device for hulling fruit has been provided with two perforated concave bowls having cutting-edges, and I make no claim to any such construction. My device is designed to fit upon and protect the thumb and finger, and this is not done by the device above referred to, as there are no caps or shields, or the equivalents thereof, into which the finger and thumb may fit and be protected.

Having thus described my invention, what I claim is—

1. As a new article of manufacture, the individual grape-tongs herein described, consisting of two cup-shaped caps or shields adapted to fit upon and to protect the thumb and finger.

2. In an implement for handling small fruit, two caps or shields adapted to fit upon and to protect the thumb and finger, and hollowed out to receive the fruit, as explained.

3. The individual grape-tongs herein described, consisting of two caps or shields adapted to fit upon the thumb and finger, respectively, and connected by an intermediate spring member.

4. The implement A, consisting of cups $a\ b$, adapted to receive the thumb and finger, and spring member $c$, the cups being hollowed, as at $d$, for the purpose explained.

ALFRED L. EDWARDS.

Witnesses:
ARABELLA S. EDWARDS,
H. G. EDWARDS.